US012547833B2

(12) United States Patent
Burth Kurka et al.

(10) Patent No.: US 12,547,833 B2
(45) Date of Patent: Feb. 10, 2026

(54) LOSSLESS AND LOSSY LARGE LANGUAGE MODEL-BASED TEXT COMPRESSION VIA ARITHMETIC CODING

(71) Applicant: Dell Products L.P., Round Rock, TX (US)

(72) Inventors: David Burth Kurka, Campinas (BR); Renam Castro da Silva, São José dos Campos (BR); Diego Vrague Noble, Pelotas (BR); Rômulo Teixeira de Abreu Pinho, Niterói (BR); Vinicius Michel Gottin, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 166 days.

(21) Appl. No.: 18/397,732

(22) Filed: Dec. 27, 2023

(65) Prior Publication Data

US 2025/0217591 A1 Jul. 3, 2025

Related U.S. Application Data

(60) Provisional application No. 63/523,568, filed on Jun. 27, 2023.

(51) Int. Cl.
*G06F 40/284* (2020.01)
*H03M 7/40* (2006.01)

(52) U.S. Cl.
CPC ........ *G06F 40/284* (2020.01); *H03M 7/4012* (2013.01)

(58) Field of Classification Search
CPC .......................... G06F 40/284; H03M 7/4012
See application file for complete search history.

(56) References Cited

U.S. PATENT DOCUMENTS

2023/0237278 A1* 7/2023 Yuan ....................... G06F 40/40 704/9

OTHER PUBLICATIONS

D. Huffman, "A Method for the Construction of Minimum-Redundancy Codes," in Proceedings of the IRE, 1952.
J. L. Gailly and M. Adler, "GZIP file format specification version 4.3," May 1996. [Online]. Available: https://www.ietf.org/rfc/rfc1952.txt.
M. Burrows and D.J. Wheeler, "A Block-sorting Lossless Data Compression Algorithm," May 1994. [Online]. Available: http://www.eecs.harvard.edu/~michaelm/CS222/burrows-wheeler.pdf.
P. Katz, "DEFLATE Compressed Data Format Specification," May 1996. [Online]. Available: https://tools.ietf.org/html/rfc1951.
(Continued)

*Primary Examiner* — Sonia L Gay
(74) *Attorney, Agent, or Firm* — Workman Nydegger

(57) ABSTRACT

One example method includes receiving, by a large language model (LLM), input text to be compressed, defining a size of a rolling window of previous tokens, generated prior to receipt of the input text, that the LLM is permitted to consider in a conditional probability estimate, generating, by the LLM, tokenized text based on the input text, and the tokenized text comprises a sequence of tokens, based on the previous tokens, obtaining a probability mass function of a next token of the sequence, providing the probability mass function as an input to an arithmetic coding (AC) scheme, and assigning, by the AC scheme, a respective binary code to the token with a highest probability as assigned by the LLM.

19 Claims, 11 Drawing Sheets

(56) References Cited

OTHER PUBLICATIONS

B. Knoll and N. d. Freitas, "A Machine Learning Perspective on Predictive Coding with PAQ8," in A Machine Learning Perspective on Predictive Coding with PAQ8, Snowbird, UT, USA, 2012.
C. E. Shannon and W. Weaver, The Mathematical Theory of Communication, University of Illinois Press, 1949.
M. A. Rahman and M. Hamada, "Lossless text compression using GPT-2 language model and Huffman coding," in SHS Web Conf, 2021.
C. S. K. Valmeekan, K. Narayanan, D. Kalathil, J. Chamberland, S. Shakkottai, "LLMZip: Lossless Text Compression using Large Language Models," Jun. 6, 2023. [Online]. Available: https://arxiv.org/abs/2306.04050.
T. C. B. a. J. G. C. a. I. H. Witten, Text Compression, New Jersey: Prentice-Hall, 1990. https://archive.org/details/textcompression00bell/mode/2up.

* cited by examiner

LOSSLESS AND LOSSY LARGE LANGUAGE MODEL-BASED TEXT COMPRESSION VIA ARITHMETIC CODING

FIELD OF THE INVENTION

Embodiments of the present invention generally relate to text compression and decompression. More particularly, at least some embodiments of the invention relate to systems, hardware, software, computer-readable media, and methods, for lossless, and lossy, LLM (large language model) based text compression using AC (arithmetic coding).

BACKGROUND

The task of data compression is a well-known problem and has been explored and optimized for several decades by now. Text compression, in particular, has been thoroughly investigated and several techniques exist for lossless compression, such as Huffman coding, gzip, bzip2, DEFLATE, and paq8, achieving performance close to Shannon's source coding theorem bounds.

Most of the work on data compression has focused on interpreting data sources as bitstreams, motivated by Shannon's seminal and fundamental work, that helped shape all modern communication and established the fundamental limits for data compression and communication. Yet, with the advent of modern machine learning methods, generative models in particular, that have shown the possibility of learning complex traits of human behavior from data, new possibilities of enabling semantic data transactions have arisen. In particular, for textual data in natural language, there have been advances in Large Language Models (LLMs), currently the state-of-the-art for many language-related tasks.

Parts of LLMs have been used in combination with lossless compression algorithms. Various works similarly apply a standard compressor over the sequence of predictions from an LLM. However, these approaches only describe the application of the compression of a sequence of rankings, with no corresponding formulation to arithmetic coding, and do not present any method for lossy compression.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
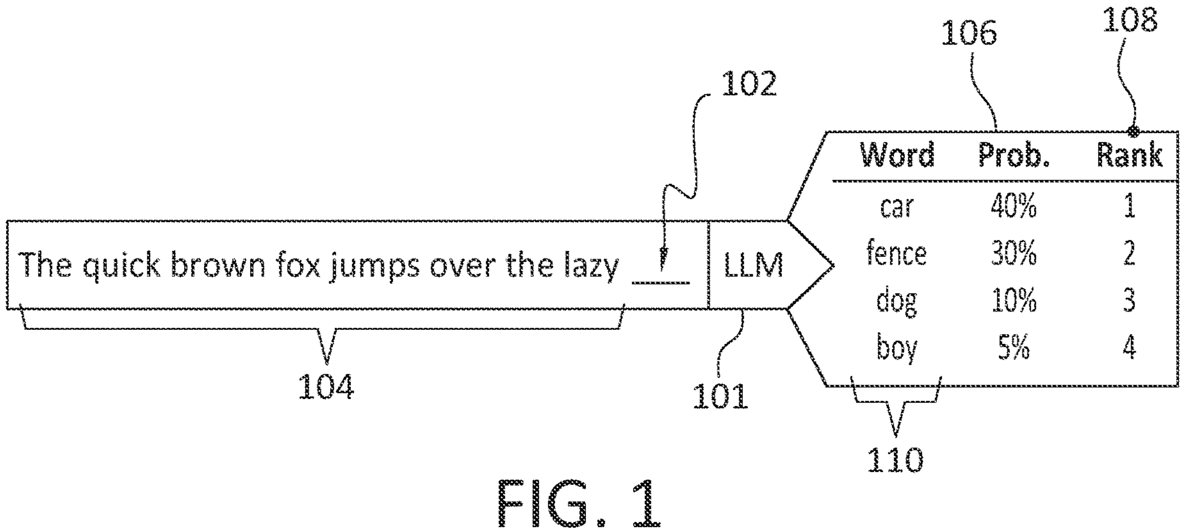
FIG. 1 discloses aspects of the prediction of a next token, following a prefix sentence, by an LLM, and yielding a rank of each possible token.

Embodiments of the present invention generally relate to text compression and decompression. More particularly, at least some embodiments of the invention relate to systems, hardware, software, computer-readable media, and methods, for lossless, and lossy, LLM (large language model) based text compression using AC (arithmetic coding).

One example embodiment comprises a data, such as text, compression method, and another example embodiment comprises a data decompression method. These are considered in turn below.

A compression method according to one embodiment may comprise the following operations:

1. Obtain a pre-trained large language model (LLM) or, alternatively, train or fine-tune a model using a training dataset representative of the domain where the compression will be applied, for example, log data;
2. Obtain some input text to be compressed;
3. Define the size of a rolling window of previous tokens that the LLM is allowed to consider in its conditional probability estimates;
4. Obtain the tokenized text from the input text;
5. Initialize Arithmetic Coding and, for each token in the tokenized text, do:
   a. Provide the previous tokens as input for the LLM and obtain, in a causal manner, a probability mass function over the dictionary tokens for the next token;
   b. Optionally, consider the replacement of the token actually occurring next in the tokenized text by a token with a higher probability assigned by the LLM, and that preserves semantic meaning of the text; and
   c. Provide the probability mass function for Arithmetic Coding (AC), so it can assign a binary code for the selected token—the AC scheme will spend $-\log(p)$ bits, where p is the probability assigned by LLM for the selected token; and
6. Finalize AC by encoding a special token indicating end of file—the output of this compression process may comprise an encoded binary file.

It is noted that this compression approach results in lossless compression when 5.b is omitted. On the other hand, when 5.b is implemented, loss is introduced during the compression, as the replacement of the token changes the resulting encoding for one that is more compressible. The replacement further comprises a test—the replacement is not realized if it increases the overall text entropy.

A decompression method according to one embodiment may comprise the following operations, which may result in the decompression of an encoded binary file such as may be created using the compression method above:

1. Obtain the exact same LLM used in the encoder, or compression, side;
2. Define the size of rolling window of previous tokens the LLM is allowed to consider in its conditional probability estimates, which may be the same size as used in the encoder side;
3. Initialize Arithmetic Decoding (AD);
4. While decoded token is different from the special token indicating end of file:
   a. Provide the windowed tokens as input for LLM and obtain, from the LLM, a probability mass function over the tokens dictionary for the next token;
   b. Provide the probability mass function for Arithmetic Decoding, so it can decode the binary code and map it to the correct token; and
   c. Add the decoded token to the rolling window of previous tokens (the oldest token is removed from the rolling window to keep the same context size) Note that, in an embodiment, there is no difference in the decompression scheme regardless of whether the lossless or lossy compression schemes are adopted.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in anyway. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that a look-ahead technique may be employed that may help to avoid entropy increases that may adversely affect compression. An embodiment may operate to compress next-token probability values directly into a compression pipeline, and thereby eliminate any need to perform post-processing compression. An embodiment may operate to replace tokens with semantically equivalent tokens with higher probability, and thereby improve a compression ratio. Various other advantages of one or more example embodiments will be apparent from this disclosure.

A. Overview

The following is a discussion of aspects of example operating environments for various embodiments of the invention. This discussion is not intended to limit the scope of the invention, or the applicability of the embodiments, in any way.

An example embodiment may operate to leverage LLMs so as to enable performance of semantic text compression. An embodiment may comprise a compression scheme that can be used for both a lossless approach, in which the decompressed text is identical to the original input; and a lossy approach in which some words, or parts of the text, may be substituted with others, with a weak guarantee that a semantic meaning is maintained.

In more detail, an embodiment may comprise a text compression approach that exploits the powerful conditional probability modeling capability of LLMs. After seeing a large corpus of texts during training, LLMs internalize, in their parameters, the intricacies of the natural language and learn the ability of extracting contextual hints that help, for instance, to predict what text strings or characters will come next in a text stream. This ability has been shown to be useful in several downstream natural language processing problems.

An LLM uses contextual information extracted in a causal manner to lower the uncertainty of what comes next in a text stream. It produces a skewed probability mass function over the tokens dictionary by assigning a high probability mass to tokens that actually occur in the text. Assuming the text being coded comes from the same distribution as the text corpus on which the LLM was trained, LLMs can be used as a competitive context modeling tool to be used with entropy coding schemes.

An embodiment may comprise an encoder, or compressor, and a decoder, or decompressor, sharing a common LLM for context modeling. Provided that the encoder explores the conditional probability estimates produced by LLM in a causal manner, the decoder is able to reproduce the same conditional probability estimates from the decoded token stream.

Therefore, for every token in a tokenized text stream, an embodiment may use the estimated probability for the next token in the stream to assign a uniquely decodable binary code to it. An embodiment may implement Arithmetic Coding (AC) as the entropy coding algorithm for translating probabilities into binary codes. The arithmetic coding may guarantee achievement of compression efficiency very close to the entropy, or lower bound, of the probability model.

This disclosure describes a compression scheme, initially in a lossless compression approach. Additional operations may be introduced to provide lossy compression, which can achieve higher compression ratios at the cost of not decompressing exactly the same text, but an alternative text that preserves the meaning of the original.

As disclosed herein, example embodiments may comprise various useful features and aspects, although no embodiment is required to include any of such features and aspects. Following are some illustrative examples. In general however, an example embodiment comprises a compression algorithm based on the arithmetic coding of the probabilities output by a large language model, and can be parametrized for both lossless and lossy compression.

One example of a feature of an embodiment is a method that uses next-token-prediction probabilities of an LLM for both lossless and lossy compression of text. As another example, an embodiment may provide for the integration of an arithmetic encoder to compress next-token probability values directly into the compression pipeline, thus eliminating the need to execute a post-processing compression step. In an embodiment that implements lossy version of the compression method, the embodiment may provide for the replacement of tokens by semantically equivalent ones with higher probability, which improves compression ratios. As another example, for the lossy version, an embodiment may comprise a look-ahead technique that ensures the token replacement does not increase overall the entropy of the text, which would be bad for compression. Further, an embodiment may comprise a decompression method that is agnostic about which version of the method, that is, lossless versus lossy, was employed. As a final example, an embodiment may comprise a compression tool that embeds a pre-trained LLM to be shared by the compression and decompression methods.

B. Context for an Example Embodiment

With reference to FIG. 1, an embodiment may relate to an approach for perplexity-based compression of text data, leveraging a fixed LLM 101. This approach may exploit the ability of the LLM to predict next words 102, that is, tokens, from an existing sequence 104, also referred to as a prefix. This approach may comprise, for a given text, storing a code that represents how predictable each part of the text is for that particular LLM 101. That is, an embodiment may compute the perplexity, or how well the LLM 101 can predict the tokens in the text, and then store, for each token, a measure of the "surprise" of the LLM when predicting that token. This prediction, by an LLM, of a next token in a sentence, following a prefix, comprising one or more previous words, is shown at 106. That is, FIG. 1 discloses the prediction, by the LLM 101, of a next token 102, following a prefix sentence 104. This prediction yields a rank 108 of each possible token 110.

Figure 2:
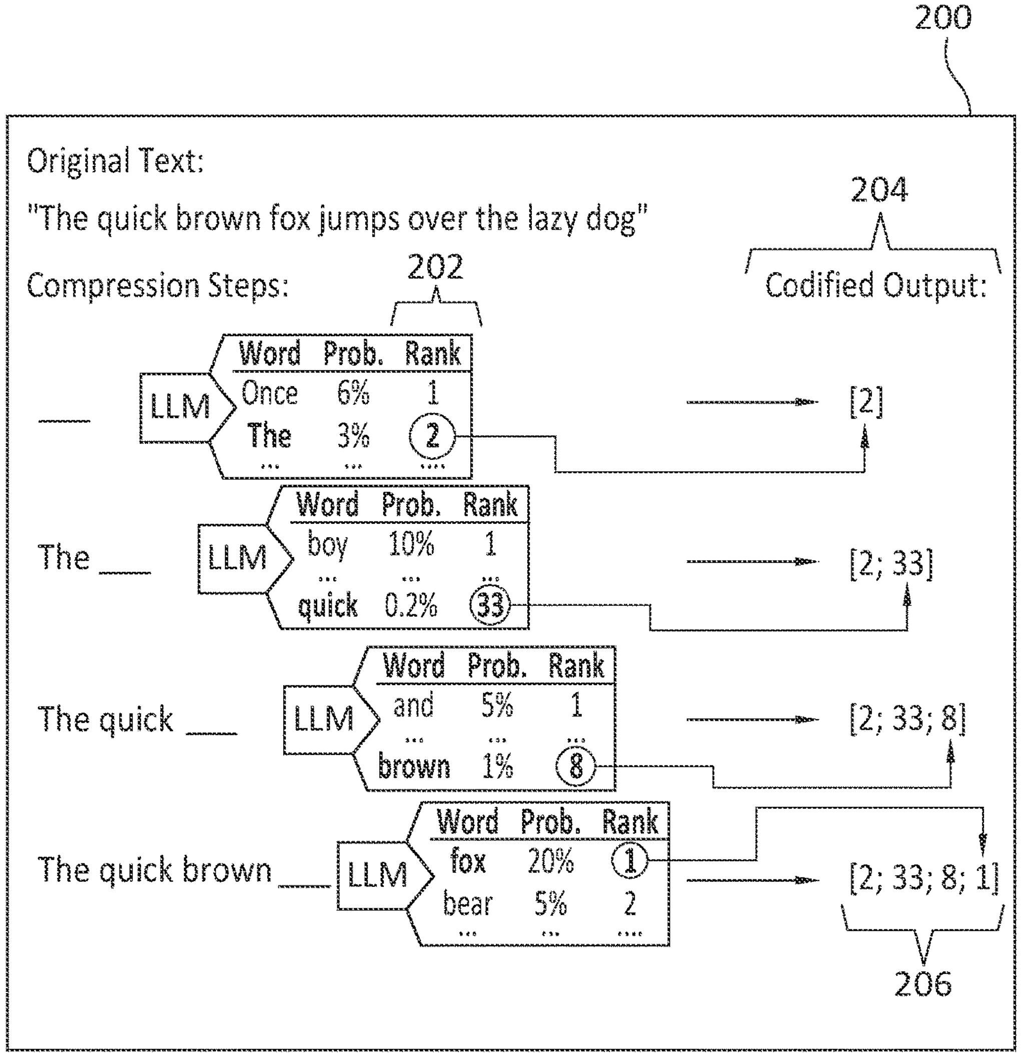
FIG. 2 discloses aspects of a compression scheme using the prediction ranks as the codified output.
Figure 3:
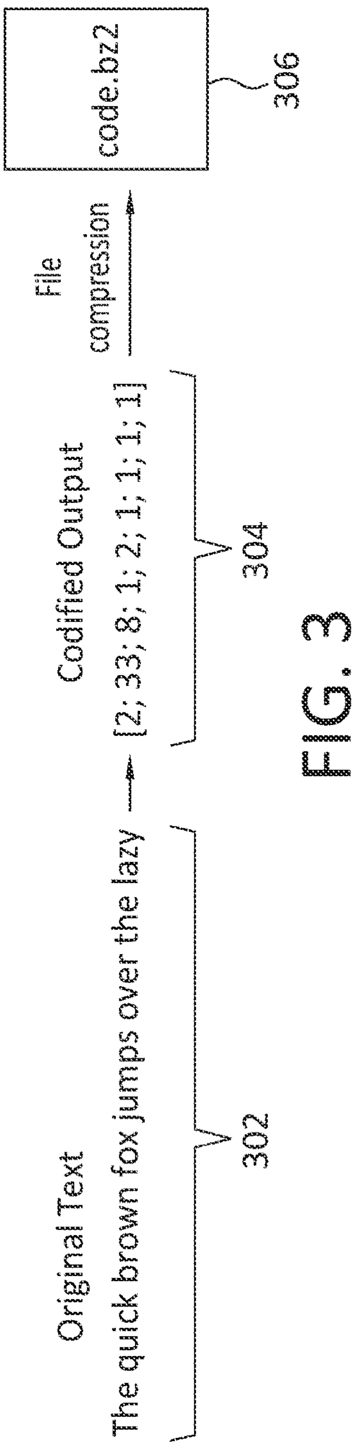
FIG. 3 discloses aspects of a full compression scheme.

Among other things, an embodiment may comprise a compression scheme that encodes the output of the LLM as a sequence of ranks of the tokens, as predicted by the LLM. This is disclosed in FIG. 2 which illustrates a compression scheme 200 that uses the prediction ranks 202 as the codified output 204. Then, the resulting sequence 206 of ranks is itself compressed in a post-processing step, such as by a compression algorithm, as shown in FIG. 3.

In particular, the compression scheme of FIG. 3 may proceed as follows: For each token $w_i$ of a given text 302:

Input c previous tokens to the LLM and predict next token's probabilities;

Retrieve the rank position $z_i$ corresponding to the expected token, given the context $$z_i = r_\theta(w_i | w_{i-1}, \ldots, w_{i-L});$$

Store in a codified output 304 the list of ranks Z; and

Compress the codified output with traditional compression algorithms (for example, bzip, gzip, paq8) to create a compressed file 306.

The decompression scheme comprises obtaining the same LLM instance used in the compression of the text, and the same number of c tokens to be used as a rolling window. This window is initially empty. Then, with the sequence Z decompressed with the appropriate traditional decompression, for each rank $z_i$ in the sequence, do:

Provide the rolling window of (at most c previous tokens) as input for the LLM and obtain, from the LLM, a prediction for the next token, ranked from the most likely, to be next, to the least likely, to be next, in the LLMs vocabulary;

Find, in the ranked list yielded by the LLM, the word corresponding to the rank position $z_i$ obtained from the current position in the sequence; and Write that word to an output file or sequence.

It is noted that the LLM may be trained with a vast amount of data and optimized to create a model that minimizes perplexity. Thus, the codified output of the trained LLM may tend to follow a power-law distribution in which the smallest, or lowest, ranks are dominant.

The resulting sequence Z should, therefore, be highly compressible by standard compression algorithms. This is supported by empirical validation—results show over 80% reduction in compressed file size from current state-of-the-art approaches.

An embodiment may deviate from the approach disclosed in FIG. 3 in various respects, in that an embodiment may, for example:

adopt an arithmetic coding scheme directly into the next-token prediction pipeline; and enable lossy compression, by substituting certain tokens for more 'compressible' output, with some semantic coherence guarantees.

C. Detailed Discussion of Aspects of an Example Embodiment

Figure 4:
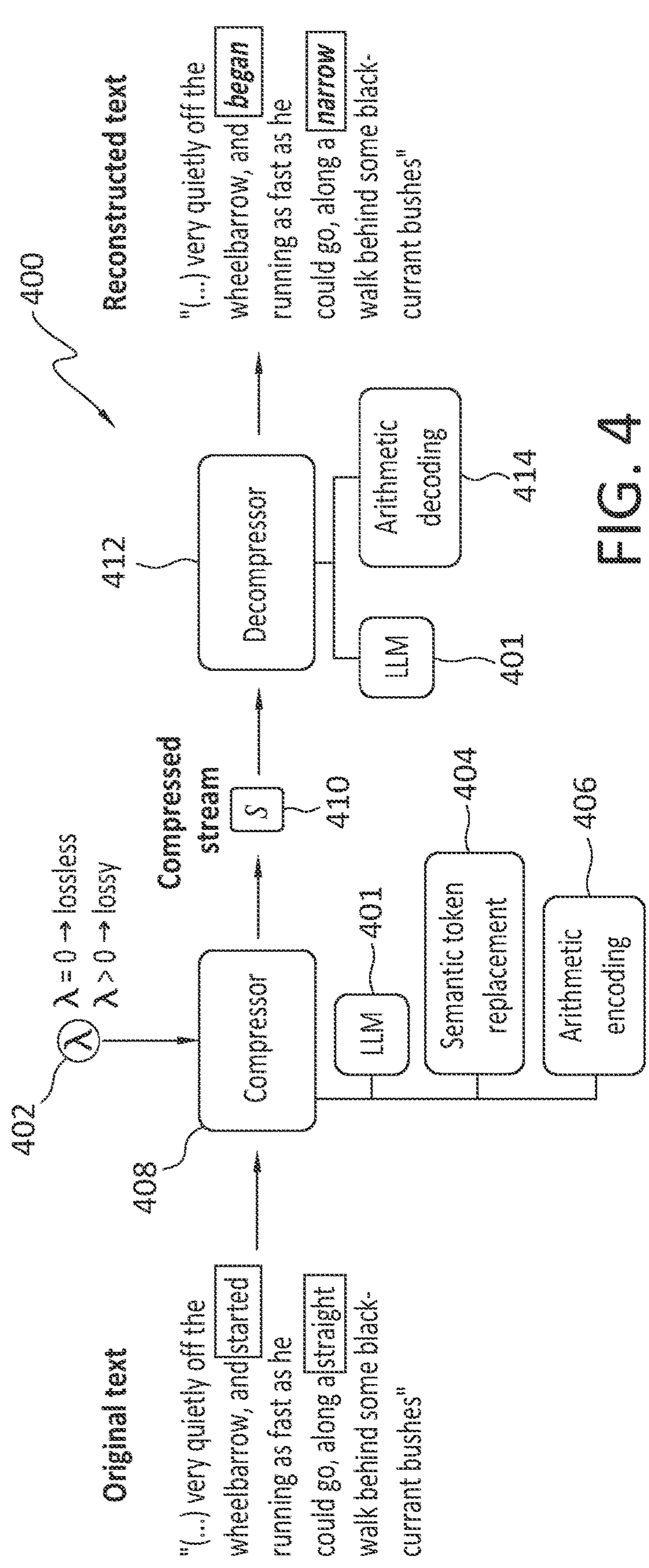
FIG. 4 discloses an overview of a method according to one embodiment.

With reference now to the example of FIG. 4, an embodiment comprises a text compression approach that leverages an LLM 401 for context modeling in an arithmetic coding scheme. In particular, FIG. 4 discloses a high-level overview of an approach 400 that may be parametrized by a value) 402 which allows/disallows semantic token replacement 404, determining the level of "loss" allowed in the reconstructed text, but allowing further compression ratio gains.

LLM models are trained to use contextual information and produce predictions, often accurate, for what comes next in a text. The approach according to one embodiment leverages the probabilities assigned by the LLM for each token in the token vocabulary, that is, the known dictionary of tokens considered by the model, to encode them. An embodiment may integrate the LLM 401 context modeling capability with AC (Arithmetic Coding) 406. The AC scheme may be executed for converting probability into uniquely decodable binary codes. The correctly predicted tokens may be coded using very few bits, although predictions with high confidence, that are nonetheless incorrect, may lead to expensive binary codes.

In brief, the compressor 408 assigns short binary codes to tokens with high probability mass, and long binary code to tokens with low probability mass, to produce a compressed stream 410. The decompression approach, implemented by a decompressor 412, leverages the same LLM to obtain predictions, possibly integrated with AC decoding 414, and, based on the compressed stream 410, can reconstruct the original text.

As further disclosed in the example of FIG. 4, an embodiment may implement both lossless compression, in which the reconstructed text is identical to the original text, and lossy compression, in which some parts of the text may be replaced with semantically equivalent ones, allowing a more efficient (smaller) compressed stream. This lossy compression is reflected in the 'reconstructed text' of FIG. 4, where 'started' in the 'original text' has been replaced with 'began' in the 'reconstructed text,' and 'straight' in the 'original text' has been replaced with 'narrow' in the 'reconstructed text.' An embodiment may provide weak guarantees that such a replacement is both efficient, for the compression process, and semantically coherent, preserving the meaning of the original text, possibly with some permissible deviation(s), as exemplified in FIG. 4.

C.1 Compression

A compression process according to an embodiment may begin with a predefined instance of an LLM, which may have been obtained from an external source, or trained and fine-tuned in a representative dataset of the intended application domain. As an alternative domain specific use-case, an embodiment may apply an LLM to system logs generated by one or more software programs.

The compression may rely on the probabilities output by the LLM for each token, given a number of preceding tokens, as defined by a context 'window.' In this approach an embodiment may we use the probabilities themselves, and not the ranking of the probabilities. An embodiment may then encode sequences of those probabilities in an arithmetic coding scheme. An encoded sequence of probabilities may be referred to as the 'codified output' of a sequence of tokens.

Figure 5:
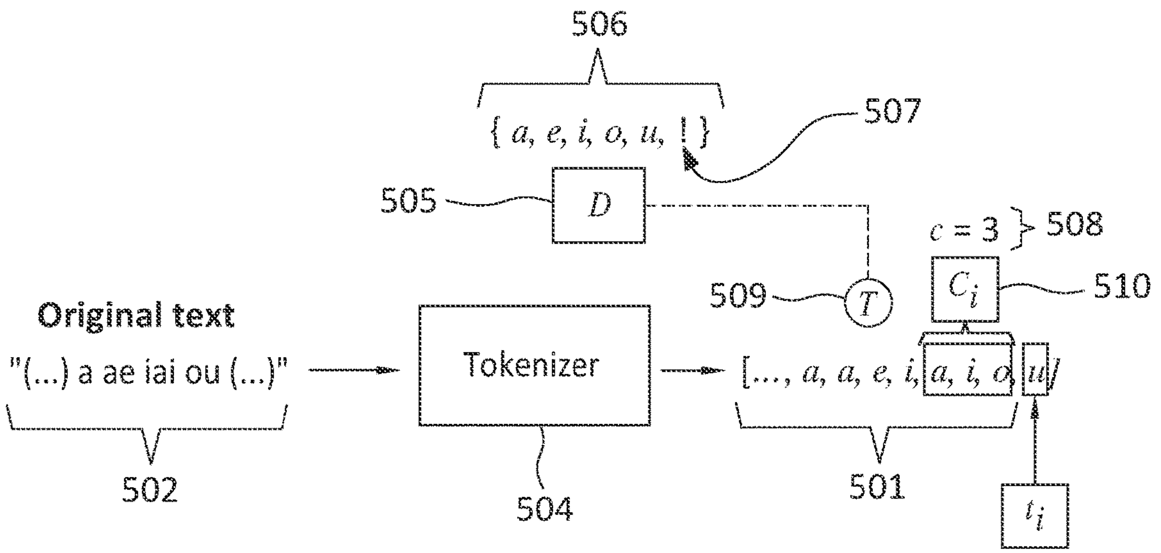
FIG. 5 discloses a token sequence obtained from an original text.

With reference now to FIG. 5, there is a token sequence 501 obtained from the original text 502. Particularly, an embodiment may obtain a sequence of tokens $T=[t_0, t_1, \ldots]$ from the original text 502 via a tokenizer 504 procedure, which may match the tokenizer used by the LLM. This procedure may be performed as an NLP (Natural Language Processing) task. Each token $t_i$ is an element in D, a set 505 of all possible tokens considered by the LLM.

It is noted that in FIG. 5 and the following examples, a toy problem is adopted, for ease of representation, in which a token set 506 contains only a few tokens. In practical applications, the size of the set can be much larger. In an embodiment, the token set 506 may contains a special token, such as '!' 507 in the example, to represent the end-of-stream.

An embodiment may also define a context window size c. This will determine the number of tokens given to the LLM to perform the prediction of the next token. In the example of FIG. 5, a context size window 508 c=3 is employed. Then, for the current token $t_i \in T$ 509 an embodiment may obtain the current context window $C_i$ 510. For the general case in which i>c, that is, all but the starting tokens, $C_i=[t_{i-c}, t_{i-c+1}, \ldots, t_{i-1}]$. For the initial case, i≤c, different strategies may apply. In the most straightforward approach, the window $C_i=[t_0, \ldots, t_{i-1}]$ may be used, with fewer than c tokens. In alternative strategies, a synthetic context, or padding of the available context, may be provided.

Figure 6:
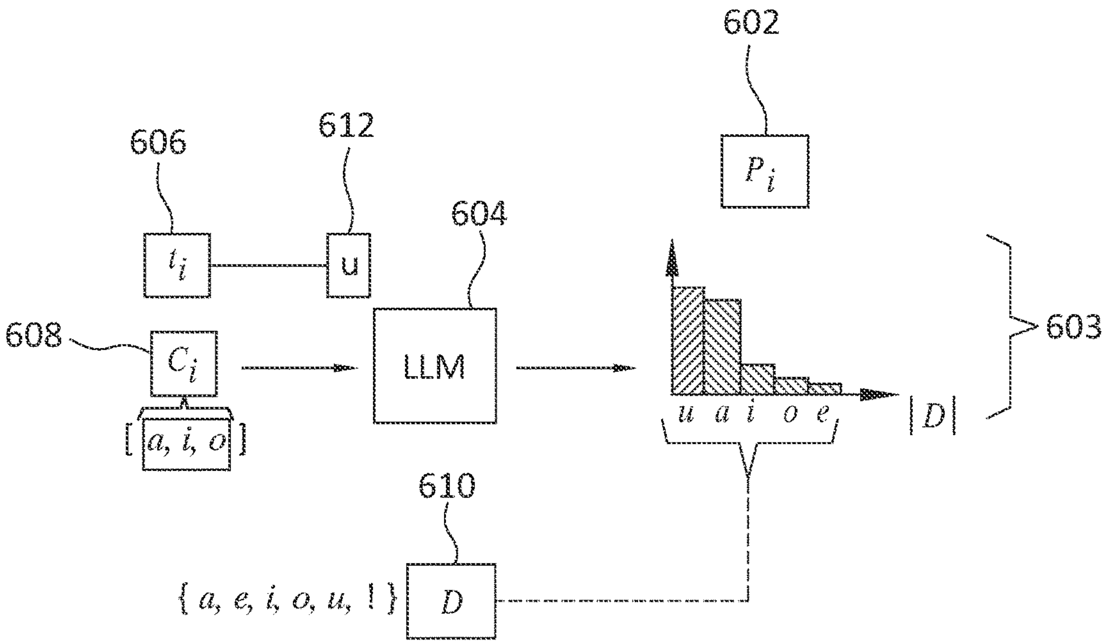
FIG. 6 discloses aspects of a probability mass function $P_i$, with the probabilities attributed by the LLM for the next token $t_i$.

With reference now to FIG. 6, there is a probability mass function $P_i$ 602, with the probabilities 603 attributed by the LLM 604 for the next token $t_i$. The model attributes highest probability to the actual next token $t_i$ 606. An embodiment may provide the context window $C_i$ 608 to the LLM 604 and obtain the probability mass function $P_i$ 602 of the probabilities of all tokens in D 610, which may be ranked from highest to lowest. This may be obtained straightforwardly from the LLM 604 output.

In the notation adopted in FIG. 6 and the following discussion, $P_i$ 602 is denoted as the probability mass function for the predictions of the LLM 604 for the actual next token $t_i$ 606. Further, $P_i[t_j]$ is denoted as the probability assigned for token $t_j \in D$ in $P_i$. In the example of FIG. 6, the most probable token, as predicted by the LLM 604, is the actual next-token u 612. This will be the most typical case, as the LLM 604 may be trained to minimize the perplexity of the next-token, and to attribute higher probabilities to the actual tokens as seen in the training dataset.

Given that an embodiment may encode the probabilities of the next-token(s) in an arithmetic coding scheme, described below, the larger probabilities result in shorter codes, and, thus, higher compression ratio. However, as disclosed in FIG. 7, there may be cases in which the actual token is attributed a lower probability than other tokens.

Figure 7:
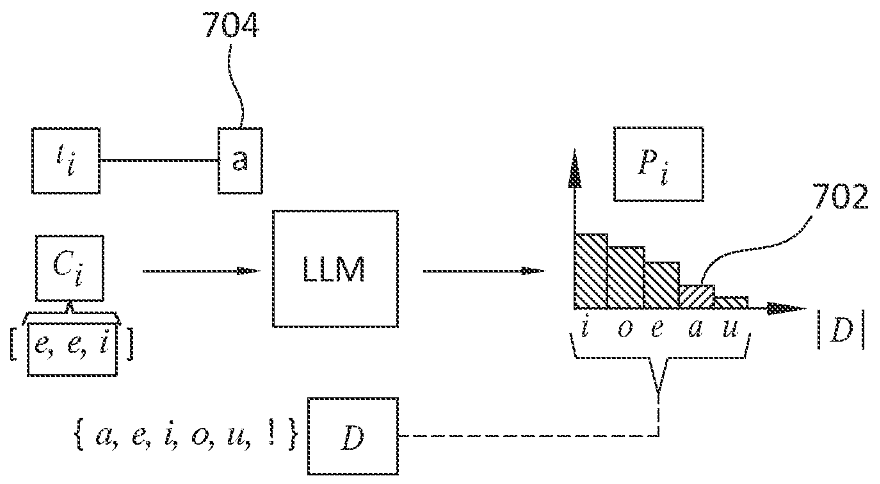
FIG. 7 discloses a case in which the probability $P_i[t_i]$ attributed to the actual next token $t_i$ is lower than the probability attributed to other tokens.

In particular, FIG. 7 discloses a circumstance in which the probability $P_i[t_i]$ 702 attributed to the actual next token $t_i$, namely, 'a' 704 is lower than the probability attributed to the other tokens. In such a case, the encoding of the actual next-token t; would require larger codes, which yield a lower compression ratio, which may not be desirable. Thus, an embodiment may comprise a strategy in for the replacement of the actual next-token t; by a higher-probability token $t_j$ in $P_i$. Furthermore, an embodiment may consider criteria for semantic coherence in this replacement. This is described in detail below.

The process of token replacement may be performed in streaming fashion. In contrast with conventional compression approaches then, an embodiment does not require the accumulation of a sequence of rankings as input to a traditional compression algorithm, such as bzip, or other. Thus, we enable both the streaming decompression of the text as well as not requiring a particular compression algorithm at the decompressor side.

C.1.1 Semantic Token Replacement

As described above, for each token in the original text, an embodiment may consider the replacement of that token with another having a higher probability. The replacement may be determined by choosing a token with a smaller, possibly substantially smaller, score. For each token $t_j$ with higher probability in $P_i$(that is, $P_i[t_j]>P_i[t_i]$), we compute a score $J(t_j)$, computed as:

$$J(t_j) = D(t_i, t_j) + \lambda R(t_j)$$

An embodiment may be focused on the $t_j$ with minimum $J(t_j)$ as candidates for the replacement, where:

- $D(t_i, t_j)$ is some distance metric between the actual next token $t_i$ and the considered replacement token $t_j$;
- $R(t_j)$ is the ratio for codifying the token, computed from $P_i[t_j]$, with a ratio of zero for the token with the highest probability, and highest ratio for the lowest probability; and
- λ is a weighing parameter, which ultimately conveys how much allowance may be made for a change in the actual token—since the distance from the actual token $t_i$ to itself $D(t_i,t_i)$ is minimal (zero), a λ value of zero means that no replacements are possible.

C.1.1.1 Procedure

Following is a description of the computation above in a procedural format, to introduce practical concerns. Particularly, in a procedural format, an embodiment of the process may proceed as follows:

1. Given a current token $t_i$ and the LLM output's $P_i$:
2. Compute the ratio $R(t_j)$ for each token $t_j \in D$ with $P_i[t_j]>P_i[t_i]$;

a. At this step, it is useful to have the probability mass function $P_i$ in a data structure that is already sorted from highest to lowest probability, as discussed above; and b. The computation of the ratios may be relatively inexpensive and may be done fully in parallel, or as a vectorized operation, and should not require additional optimization in practice;

3. For each token t; from lowest ratio to highest, compute the distance $D(t_i,t_j)$:

a. A halting process may be applied so that not all, possibly relatively expensive, distances need to be computed—an additional mechanism may be applied so that only an arbitrary number of the lowest ratio, that is, the highest probability, tokens are considered—alternatively, other halting criteria may be defined including considering the ranks for the tokens;

b. The distance function may comprise any suitable implementation, such as relying on the cosine similarity between the feature vectors of the tokens as encoded by an LM (Language Model) trained to generate semantic embeddings—it is noted that this may not be the same LLM as one used for obtaining the probabilities—finally, a threshold z of maximum distance may be determined such that tokens $t_j$ considered too semantically different are completely disregarded;

a. Obtain the score $J(t_j)=D(t_i,t_j)+AR(t_j)$ for each considered token—the considered tokens will not contain the discarded tokens, either by the halting process (in 3.a) or exceeding the distance threshold (in 3.b);

4. Store $t_j$, $J(t_j)$ in an array $\mathbb{J}$ relating candidate replacement tokens and their respective scores; and 5. Sort $\mathbb{J}$ from lowest to highest.

Then, the optimal candidate token for replacement token is the first element in $\mathbb{J}$. An embodiment may consider the following candidates (second, third, and so forth) depending on additional criteria (as described above). The value in $\mathbb{J}$ may be on a scale that depends on the distance function D and $\lambda$.

In a formulation according to one embodiment, the whole process can be skipped (after step 1) if $\lambda=0$ as the rank factor will be disregarded and the actual next token $t_i$ will always have the lowest score $J(t_i)$ since $D(t_i, t_i)=0$. Even without skipping, the computation naturally would yield $\mathbb{J}$ containing the actual token as the top option. An example of the process is disclosed in FIG. 8, discussed below.

Figure 8:
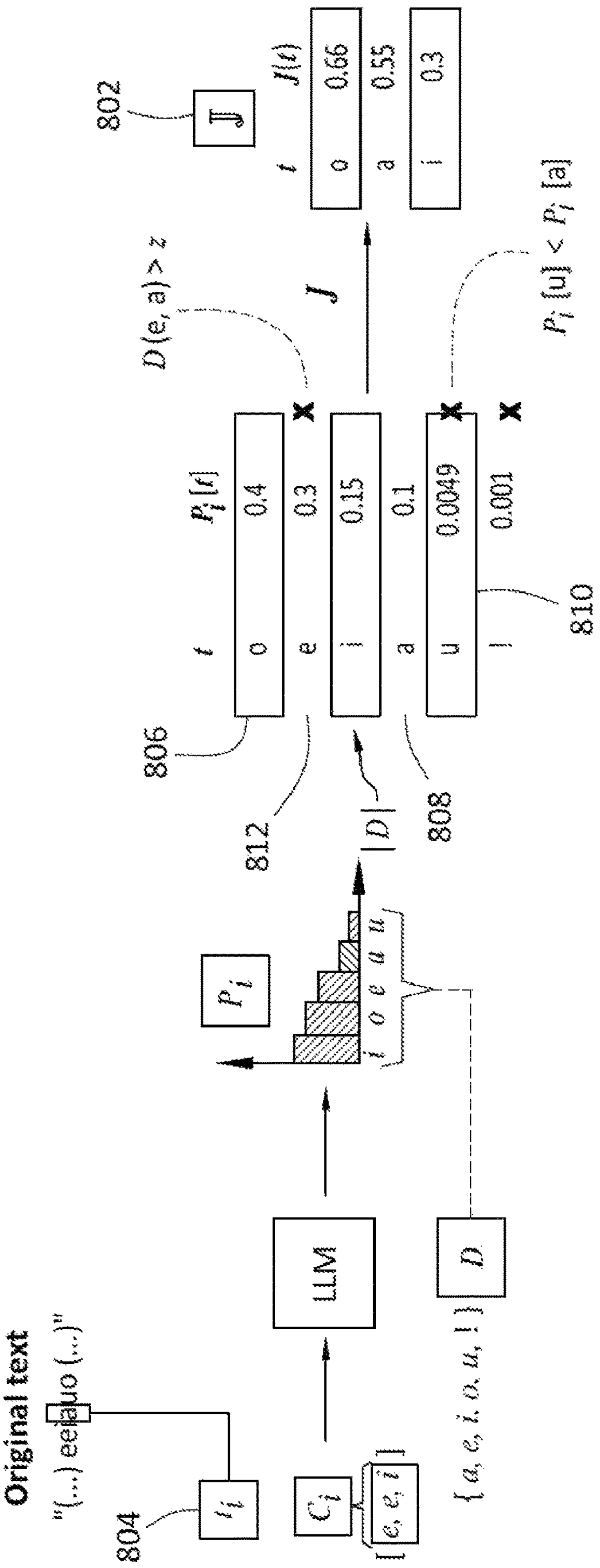
FIG. 8 discloses an example of candidate replacement tokens $\mathbb{J}$ obtained for the actual next token $t_i$'a'.

Particularly, FIG. 8 discloses an example of candidate replacement tokens $\mathbb{J}$ 802 obtained for the actual next token $t_i$ 'a' 804. In the example of FIG. 8, the process considers that token 'o' 806 can suitably replace token 'a' 808—in fact, token 'o' 806 is preferred in this example. The example also shows, using the notation 'X,' that token 'u' 810 is discarded (in step 2, discussed above) for having a lower probability (0.0049) assigned than the actual token; and token 'e' 812 is discarded (in step 3.b, discussed above) for having a semantically meaningful distance to the actual token that is larger than the threshold z.

In the example of FIG. 8, there are a limited number of tokens, simply for facilitating the explanation. In a typical embodiment, the number of tokens can be numerous, which is why, in step 3.a (above), an embodiment may limit the number of tokens considered. In an alternative example, following the setup from FIG. 8, in which only the 2 top tokens are considered, the token 'i' would have been discarded by the stopping criteria. It is noted that regardless of the chosen parameter $\lambda$, threshold and limits, $\mathbb{J}$ 802 will always include, at least, the actual token $t_i$.

C.1.1.2 Look-Ahead Test

With $\mathbb{J}$ (see, e.g., $\mathbb{J}$ 802 in FIG. 8) in hand, an additional test may be performed. This test may help to ensure that realizing a replacement of the actual next token $t_i$ by a candidate replacement token $t_j$ does not increase the entropy of the subsequent text. Intuitively, it would not be desirable to replace token $t_i$ with a token having a higher probability—thus codifying it in fewer bits—only to have to codify $t_{i+1}$, $t_{i+2}$, . . . in more bits.

An embodiment of this process, which may be referred to as a 'look-ahead test,' is as follows. Initially, and with reference now to the example of FIG. 9, a look-ahead window 902 of W tokens may be defined, such that the window is smaller than the size of the context, W<c. Then do:

1) For each token $t_j$ 903 in $\mathbb{J}$ 904, in order, such that the first element, that is, the optimal replacement candidate, is considered first:

a) If $t_j=t_i$; terminate—no replacement takes place b) Else, For w in 1 . . . W 902:

i) Initialize $e_i=0$ and $e_j=0$;

ii) Obtain context $C_{i+w}$ 906;

iii) Build the replacement context $C_{i=w}$* 908 by removing the $t_i$ at the (c−w+1)-th element of $C_{i+w}$* 908 and replacing it for $t_j$, instead of $t_i$;

iv) Obtain $P_{i+w}$ 910 by providing $C_{i+w}$ 906 to the LLM 912;

v) Obtain $P_{i+w}$* 914 by providing $C_{i+w}$* 908 to the LLM 916; and vi) Update $e_i \leftarrow e_i+P_{i+w}[t_{i+w}]$ and $e_j \leftarrow e_i+P_{i+w}^*[t_{i+w}]$;

c) If $e_i>e_j$; continue; and d) Else, replace $t_i$ for $t_j$ for the arithmetic encoding procedure, and terminate.

The obtaining of the context $C_{i+w}$ 906 is straightforward from the list of tokens T generated from the original text, as described above, that is $C_{i+w}=[t_{i+w-c}, t_{i+w-c+1}, \ldots, t_{i+w-1}]$. The values $e_i$ and $e_j$ represent a measure of how accurately the LLM can predict the correct, actually occurring, next tokens with, and without, the replacement.

Figure 9:
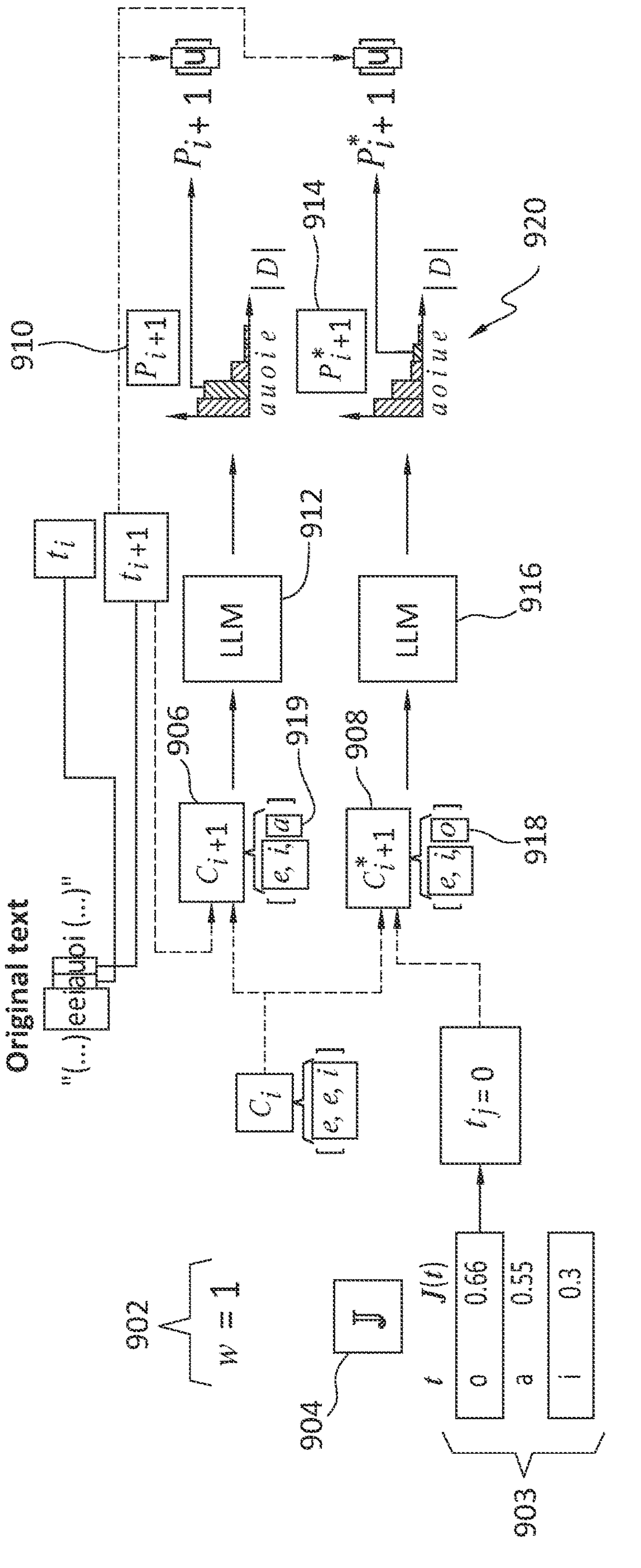
FIG. 9 discloses aspects of a look-ahead of the probabilities assigned to the follow-up token with and without replacement, considering the first step in a window.

With continued reference to FIG. 9, disclosing a look-ahead of the probabilities assigned to the follow-up token with and without replacement, a first iteration of an example process is disclosed there. Here, assuming a window size W=2, there are two iterations of the inner loop above at 1.b.

Particularly, the example of FIG. 9 discloses how substituting replacement token 'o' 918 for the actual token 'a' 919 significantly lowers the probability of the follow up token 'u' 920 so that the replacement may actually cause an increase in the number of bits for the encoding of that follow up token, which is undesirable and undermines the purpose of the compression. After this first iteration with w=1, the value $e_i$ is therefore larger than the value $e_j$. Consider, however, the follow-up iteration with w=2, discussed below in connection with FIG. 10.

Figure 10:
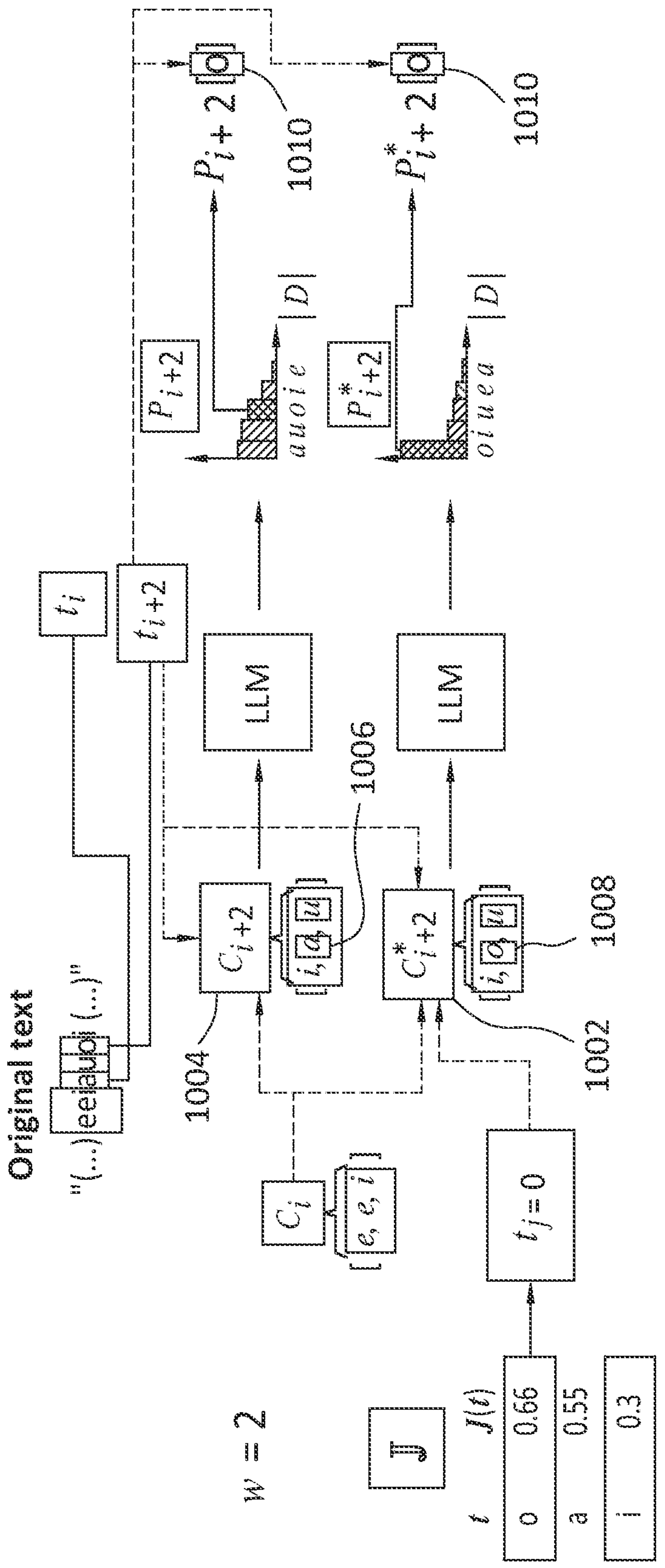
FIG. 10 discloses aspects of a follow up look-ahead of the probabilities assigned to the follow-up token with, and without, token replacement.

In particular, FIG. 10 discloses the follow up look-ahead of the probabilities assigned to the follow-up token with, and without, replacement. It is noted that the context $C_{i+2}$* 1002 corresponds to the context $C_{i+2}$ 1004, but replaces the actual token 1006 $t_i$('a') by the candidate replacement token 1008 $t_j$ ('o') at the appropriate position. It is further noted that, in this iteration, the probabilities compared considered the probability assigned to the actual follow up token 1010 $t_{i+2}$ ('o').

In this iteration, the probability of predicting the correct token is much larger for the case with replacement, however. Hence, after updating the values, e; is now lower than the value $e_j$. This example thus illustrates the value, in one embodiment, of considering a look-ahead window, instead of considering only the effect on the next token when implementing the replacement.

Thus, in this example, an embodiment may proceed with the replacement of the token 'a' for the token 'o' before proceeding with the arithmetic encoding, as described below. Regardless of the parametrization for the window size, it is noted that some of the computations used for the look-ahead can be reutilized by the main semantic token procedure, described above. Namely, with the look-ahead mechanism each probability mass function $P_i$ may be required several times. An embodiment may assume that appropriate mechanisms for memorization, and for sparing unnecessary redundant computations, may be implemented.

C.1.2 Arithmetic Encoding

In an embodiment, the AC (Arithmetic Coding) may feature a clear separation of the statistical modeling from the coding of a message coming out of an information source. This feature may enable leveraging of the contextual modeling power of LLM and provide its conditional probability models to arithmetic coding, which may be responsible for assigning binary codes according to the statistical model of the source. In an embodiment, AC guarantees achievement of compression efficiency very close to the entropy, or lower bound, of the probability model of the source.

In a formulation according to one embodiment, in every step of the coding process, the LLM assigns a probability mass to the next-token, either the one actually occurring, or the one yielding the lowest rate-distortion cost as explained above. This probability may be used by AC to encode the token by assigning a binary code whose length approximates to the theoretic $-\log_2(P_i(t_r))$ bits. The difference here may be due to practical consideration when implementing arithmetic coding using integer arithmetic.

Figure 11:
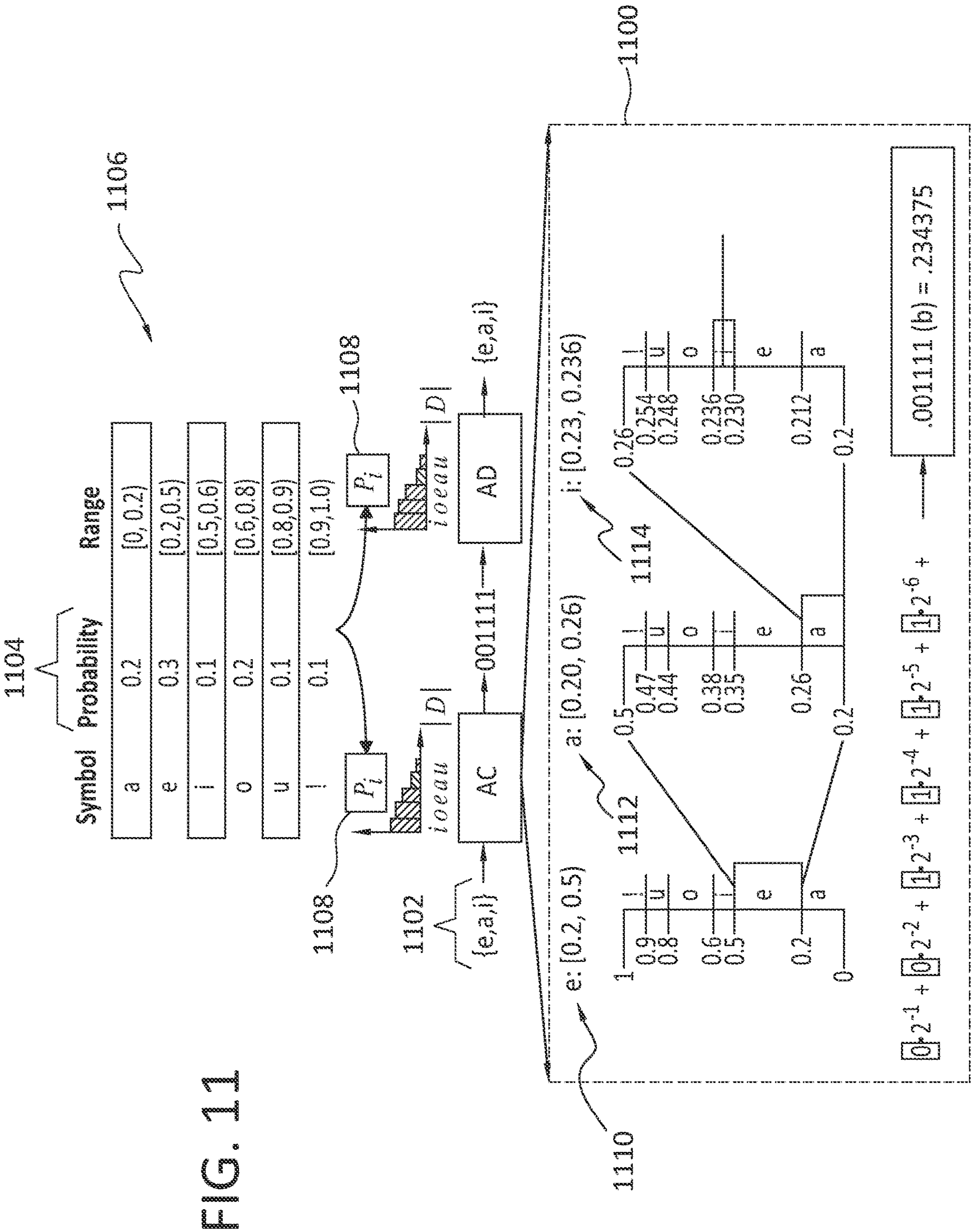
FIG. 11 discloses aspects of an arithmetic coding scheme in which the message is mapped to an interval and a number within the interval is represented in binary format.

In the interest of clarity, a discussion will be provided of arithmetic coding from a theoretical standpoint. Consider the example disclosed in FIG. 11, which assumes a fixed probability model. In practice, the LLM will produce a probability model at every step of the compression process since the context is constantly changing, as is the LLM estimation about what token comes next. A sequence of tokens may be encoded as schematically depicted in FIG. 11. Particularly, FIG. 11 discloses an arithmetic coding scheme 1100 in which the message 1102 is mapped to an interval and a number within the interval is represented in binary format.

In FIG. 11, the message 1102 to be coded is comprised of 3 tokens, namely, {e,a,i}, with respective probability mass 1104 as given in the table 1106. In this example, an embodiment may consider the PMF $P_i$ 1108 as fixed for all i.

An embodiment may begin partitioning the unit interval according to the cumulative probability assigned to every token in the token dictionary. As the first token 1110 is {e}, the interval is reduced to [0.2, 0.5). Then, the new interval, as indicated with respect to the second token 1112 {a}, is again partitioned according to the probability model. AC continues in this way until the last token 1114, {i} in this example, is processed. The result is an internal that encodes the sequence of tokens.

In the ongoing example, the final interval, for token 1114 {i}, is [0.230, 0.236). Next, any number within the final interval is represented in binary format and written to file. For the example in FIG. 11, writing to file the number 0.234375 with binary code 0.001111 will work. In AC, coding high probable sequence of tokens may lead to less bit expenditure processing than low probable sequences.

A modification to AC employed in an embodiment of the method is that, instead of encoding sequences, the AC process is applied on a token-by-token basis. This may be required because, for each token to be predicted, there is a new PMF. As a result, the binary code reflects the cumulative probability of the selected token, be it in the lossy, or lossless, version of the algorithm. Note, however, that while the original AC may require a first pass through the entire data to obtain the PMF of the symbols in it, this example approach obtains a priori PFM for each token as a natural outcome of the LLM's next-token-prediction process.

The arithmetic decoder (AD) may work similarly, provided that the AD shares the same probability model with arithmetic encoder, and given the encoded value. Mimicking AC, AD starts by partitioning the unit interval and seeking the token whose interval includes the encoded value. AD can determine without doubt that the first token was {e}, since the encoded value falls into [0.2, 0.5). After that, AD mimics AC by partitioning the new interval according to the probability model. Then, AD can determine the second token is {a} because the encoded value falls between [0.2, 0.26). AD continues this way until encountering a special token indicating end of stream. Following the modification of the AC encoding process, the AD may also consider the PMF of each symbol obtained from the LMM to decode on token at a time.

The description of arithmetic coding herein has not considered edge cases, or the incremental coding and decoding capability of practical integer arithmetic implementation. A throughout description of arithmetic coding may be found in "T. C. B. a. J. G. C. a. l. H. Witten, *Text Compression*, New Jersey: Prentice-Hall, 1990," incorporated herein in its entirety by this reference. However, an embodiment may explore the incremental coding and decoding capability of arithmetic coding, meaning that the encoder does not need to wait for the final token before writing to the encoded stream.

C.2 Decompression

Figure 12:
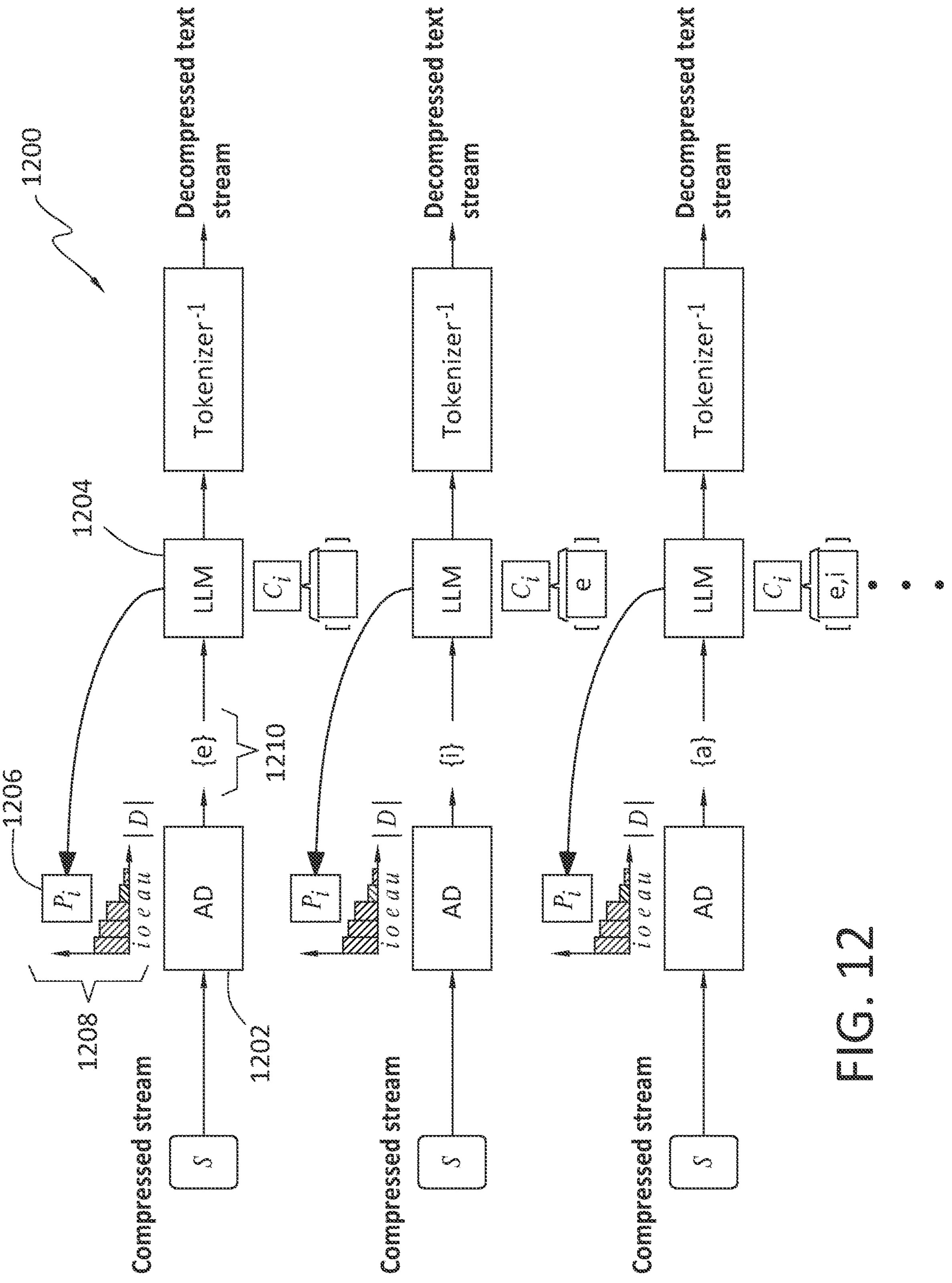
FIG. 12 discloses aspects of an example decompression process.

In an embodiment, and with reference now to the example of FIG. 12, a decompression process 1200 may start by assuming the same LLM model and context size used in the encoder side are instantiated at the decoder. Then, the decoder initiates an arithmetic decoding process. To do this, the AD 1202 asks the LLM 1204 to provide AD with a probability mass function 1206 over the token dictionary 1208.

At the beginning, there are no previous decoded tokens to be provided as context to the LLM 1204. The LLM 1204 may assign a high probability mass to the token 1210, such as {e} in the example of FIG. 12, used to start a text. The probability mass function 1206 used to encode the first token 1210 may be obtained in the same way on the encoder side, therefore the LLM 1204 can reproduce the same estimate and AD 1202 is able to determine unequivocally the encoded token as described earlier herein.

Every newly decoded token may be kept in a context window visible to the LLM 1204 for context modeling. The newly decoded token is added to start of context window. When the context window is full, the token at the tail of the context window is dropped, so the context window is kept consistent with the context used by LLM at the encoder side. The LLM 1204 is again asked to predict the next token, now using the updated context window. Once again, the LLM 1204 may reproduce the same probability estimates as were computed in the encoder, thus allowing arithmetic decoding to properly determine the next token from the encoded stream. After each step of decoding, the decoded token is fed to the tokenizer for translating token into text. This process continues until a special token indicating end of stream is decoded. This decompression process is schematically depicted in FIG. 12.

It is noted that the decoding process may be the same irrespective of the compression mode used in the encoder, be it lossless or lossy. The same applies to the Lagrangian multiplier used to weight the rate relative to the semantic distortion, since it is only used to drive the decisions in the encoder and does not change the decoder behavior.

D. Experiments and Results

The inventors have conducted a set of experiments to showcase the pertinence of an example embodiment in terms of compression efficiency. To this end, the lossless compression mode, according to one embodiment, was executed on a set of text files and the results compared with those obtained using traditional compression algorithm including bzip, paq7, and paq8n.

The benchmarking algorithms were set up to run at their best performance in terms of compression efficiency. One embodiment adopted a pre-trained distilled GPT2 model and limited the context size to 100 tokens. Note that the adopted context size is considerably lower than the maximum context size that the model accepts. In general, the larger the context size, the higher compression efficiency that an embodiment may achieve.

Figure 13:
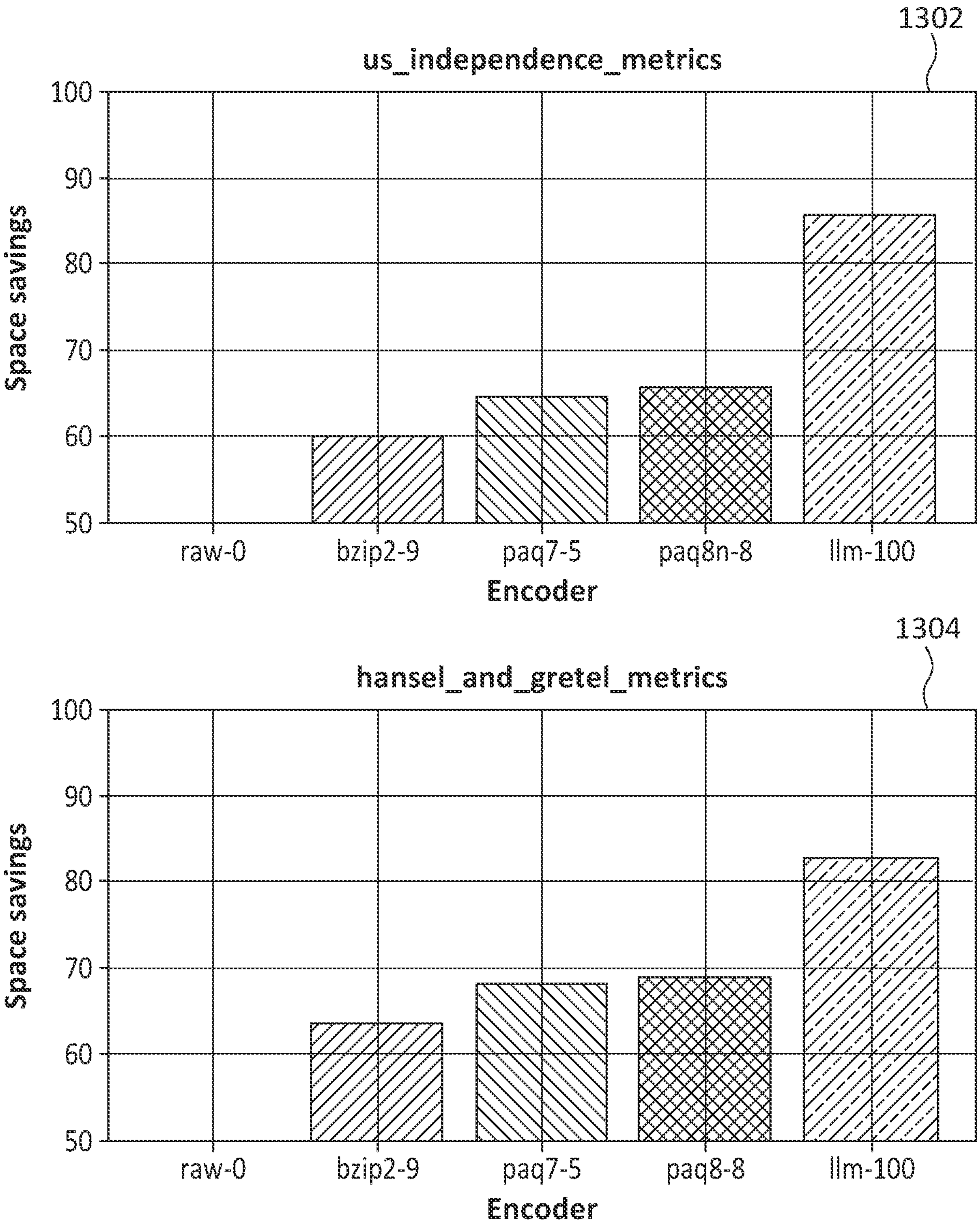
FIG. 13 discloses aspects of space savings achieved with an embodiment.

FIG. 13 shows the compression efficiency for two text files, namely US_Independence and Hansel_and_Gretel. Particularly, FIG. 13 discloses 'space saving' (y-axis) metrics 1302 and 1304, respectively, for text: (top) US_Independence; (bottom) Hansel_and_Gretel, and one example embodiment llm-100 (far right in FIG. 13). The compression efficiency may be assessed by the space saving, where higher is better, defined as:

$$\text{space saving} = \left(1 - \frac{\text{compressed\_size}}{\text{raw\_size}}\right) \cdot 100$$

As show in FIG. 13, an example embodiment, llm-100, achieves a significantly higher level of space saving than the other indicated compression schemes.

E. Example Methods

It is noted with respect to the disclosed methods, including the example methods of FIGS. 4-12, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

F. Further Example Embodiments

Following are some further example embodiments of the invention. These are presented only by way of example and are not intended to limit the scope of the invention in any way.

Embodiment 1. A method, comprising: receiving, by a large language model (LLM), input text to be compressed; defining a size of a rolling window of previous tokens, generated prior to receipt of the input text, that the LLM is permitted to consider in a conditional probability estimate; generating, by the LLM, tokenized text based on the input text, and the tokenized text comprises a sequence of tokens; based on the previous tokens, obtaining a probability mass function of a next token of the sequence; providing the probability mass function as an input to an arithmetic coding (AC) scheme; and assigning, by the AC scheme, a respective binary code to the token with a highest probability as assigned by the LLM.

Embodiment 2. The method as recited in any preceding embodiment, wherein a last token of the tokenized text is replaced with the next predicted token.

Embodiment 3. The method as recited in any preceding embodiment, wherein the method is performed in a streaming fashion.

Embodiment 4. The method as recited in any preceding embodiment, wherein a last token of the tokenized text is replaced with the next predicted token, and the next predicted token has a higher probability than the last token of the tokenized text.

Embodiment 5. The method as recited in embodiment 4, wherein the next predicted token is assigned by the LLM and preserves a semantic meaning of the input text.

Embodiment 6. The method as recited in embodiment 4, wherein the token replacement incurs loss in compression of the input text.

Embodiment 7. The method as recited in embodiment 4, wherein a look-ahead technique is performed to ensure that replacement of a token of the tokenized text does not increase an overall entropy of the tokenized text.

Embodiment 8. The method as recited in any preceding embodiment, further comprising decompressing the binary codes assigned by the AC scheme.

Embodiment 9. A system, comprising hardware and/or software, operable to perform any of the operations, methods, or processes, or any portion of any of these, disclosed herein.

Embodiment 10. A non-transitory storage medium having stored therein instructions that are executable by one or more hardware processors to perform operations comprising the operations of any one or more of embodiments 1-8.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 14:
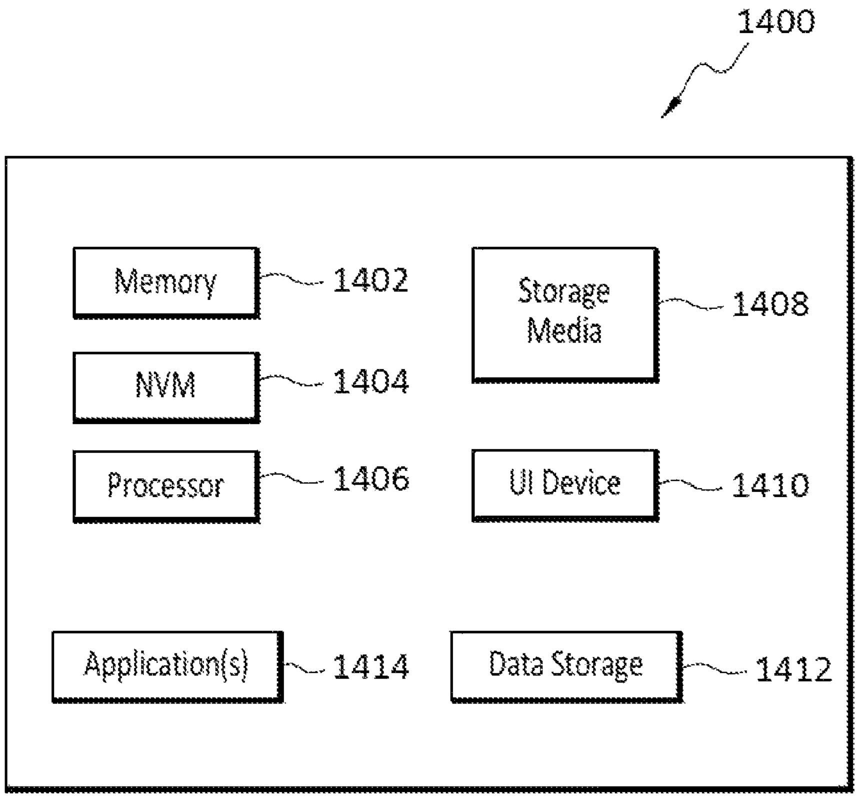
FIG. 14 discloses an example computing entity configured and operable to perform any of the disclosed methods, processes, and operations.

With reference briefly now to FIG. 14, any one or more of the entities disclosed, or implied, by FIGS. 1-13, and/or elsewhere herein, may take the form of, or include, or be implemented on, or hosted by, a physical computing device, one example of which is denoted at 1400. As well, where any of the aforementioned elements comprise or consist of a virtual machine (VM), that VM may constitute a virtualization of any combination of the physical components disclosed in FIG. 14.

In the example of FIG. 14, the physical computing device 1400 includes a memory 1402 which may include one, some, or all, of random access memory (RAM), non-volatile memory (NVM) 1404 such as NVRAM for example, read-only memory (ROM), and persistent memory, one or more hardware processors 1406, non-transitory storage media 1408, UI device 1410, and data storage 1412. One or more of the memory components 1402 of the physical computing device 1400 may take the form of solid state device (SSD) storage. As well, one or more applications 1414 may be provided that comprise instructions executable by one or more hardware processors 1416 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

receiving, by a large language model (LLM), input text to be compressed;

defining a size of a rolling window of previous tokens, generated prior to receipt of the input text, that the LLM is permitted to consider in a conditional probability estimate;

generating, by the LLM, tokenized text based on the input text, and the tokenized text comprises a sequence of tokens;

based on the previous tokens, obtaining a probability mass function of a next predicted token of the sequence, and a last token of the tokenized text is replaced with the next predicted token, and the next predicted token has a higher probability than a probability of the last token of the tokenized text, and the replacement of the last token with the next token incurs a loss in compression of the input text;

providing the probability mass function as an input to an arithmetic coding (AC) scheme; and assigning, by the AC scheme, a respective binary code to the token with a highest probability as assigned by the LLM.

2. The method as recited in claim 1, wherein the method is performed in a streaming fashion.

3. The method as recited in claim 1, wherein the next predicted token is assigned by the LLM and preserves a semantic meaning of the input text.

4. The method as recited in claim 1, wherein a look-ahead technique is performed to ensure that replacement of a token of the tokenized text does not increase an overall entropy of the tokenized text.

5. The method as recited in claim 1, further comprising decompressing the binary codes assigned by the AC scheme.

6. A non-transitory storage medium having stored therein instructions that are executable by one or more hardware processors to perform operations comprising:
- receiving, by a large language model (LLM), input text to be compressed;
- defining a size of a rolling window of previous tokens, generated prior to receipt of the input text, that the LLM is permitted to consider in a conditional probability estimate;
- generating, by the LLM, tokenized text based on the input text, and the tokenized text comprises a sequence of tokens;
- based on the previous tokens, obtaining a probability mass function of a next predicted token of the sequence;
- performing a look-ahead technique to ensure that replacement of a token of the tokenized text does not increase an overall entropy of the tokenized text;
- replacing a last token of the tokenized text with the next predicted token, where the next predicted token has a higher probability than a probability of the last token of the tokenized text;
- providing the probability mass function as an input to an arithmetic coding (AC) scheme; and
- assigning, by the AC scheme, a respective binary code to the token with a highest probability as assigned by the LLM.

7. The non-transitory storage medium as recited in claim 6, wherein the operations are performed in a streaming fashion.

8. The non-transitory storage medium as recited in claim 6, wherein the next predicted token is assigned by the LLM and preserves a semantic meaning of the input text.

9. The non-transitory storage medium as recited in claim 6, wherein replacing the last token incurs a loss in compression of the input text.

10. The non-transitory storage medium as recited in claim 6, further comprising decompressing the binary codes assigned by the AC scheme.

11. A system, comprising:
- one or more hardware processors; and
- a non-transitory storage medium having stored therein instructions that are executable by one or more hardware processors to perform operations comprising:
- receiving, by a large language model (LLM), input text to be compressed;
- defining a size of a rolling window of previous tokens, generated prior to receipt of the input text, that the LLM is permitted to consider in a conditional probability estimate;
- generating, by the LLM, tokenized text based on the input text, and the tokenized text comprises a sequence of tokens;
- based on the previous tokens, obtaining a probability mass function of a next predicted token of the sequence;
- performing a look-ahead technique to ensure that replacement of a token of the tokenized text does not increase an overall entropy of the tokenized text;
- replacing a last token of the tokenized text with the next predicted token, where the next predicted token has a higher probability than a probability of the last token of the tokenized text;
- providing the probability mass function as an input to an arithmetic coding (AC) scheme; and
- assigning, by the AC scheme, a respective binary code to the token with a highest probability as assigned by the LLM.

12. The system as recited in claim 11, wherein replacing the last token incurs a loss in compression of the input text.

13. The system as recited in claim 11, wherein the next predicted token is assigned by the LLM and preserves a semantic meaning of the input text.

14. The system as recited in claim 11, further comprising decompressing the binary codes assigned by the AC scheme.

15. The non-transitory storage medium as recited in claim 6, wherein the AC is finalized by encoding a special token indicating end of file and generating an output that comprises an encoded binary file.

16. The non-transitory storage medium as recited in claim 15, further comprising performing a decompression process to decompress the encoded binary file.

17. The non-transitory storage medium as recited in claim 16, wherein the decompression process comprises an arithmetic decoding process.

18. The non-transitory storage medium as recited in claim 6, wherein the next predicted token is semantically equivalent to the last token.

19. The non-transitory storage medium as recited in claim 6, wherein the operations collectively define a compression process that is lossless when the next predicted token is the same as the last token, and is lossy when the next predicted token is different from the last token.

* * * * *